United States Patent Office 3,498,765
Patented Mar. 3, 1970

3,498,765
CAPACITOR FOIL COMPOSED OF ALLOYS OF ALUMINUM AND CADMIUM OR INDIUM
Matthew Scott Hunter, New Kensington, Pa., assignor to Aluminum Company of America, Pittsburgh, Pa., a corporation of Pennsylvania
No Drawing. Filed Sept. 6, 1966, Ser. No. 577,137
Int. Cl. C22c 2/00; B22f 5/00
U.S. Cl. 29—183                          7 Claims

ABSTRACT OF THE DISCLOSURE

Aluminum alloy capacitor foil of improved etching factor containing 0.0002 to 0.015% of indium or cadmium.

---

This invention relates to aluminum alloy foil for electrolytic capacitors. An object is the provision of aluminum alloy foil having improved response to etching treatments so as to develop increased specific capacitance.

In accordance with the invention small but effective amounts of either indium or cadmium significantly improve the response of aluminum foil to etching treatments and the like designed to increase the surface area, and hence the specific capacitance, of the foil. The alloy additives contemplated herein are 0.0002 to 0.015% cadmium or indium. A preferred embodiment contemplates the addition of 0.002 to 0.010% of either cadmium or indium, all the percentages referred to being by weight. The cadmium and indium are added to capacitor grade aluminum which may be aluminum of commercial purity, containing at least 99% aluminum, although grades of higher purity such as the common 1145 grade containing 99.45% aluminum, or even higher grades, containing 99.99% aluminum, are also useful and often preferable. Small amounts of other elements may be present in the aluminum foil compositions such as up to 0.05% by weight copper, 0.05% manganese, up to 0.55% iron and silicon combined, and up to 0.03% each of other incidental elements. The combined total of all incidental elements, present as impurities, or otherwise, should not exceed 1%, and preferably should not exceed 0.5% of the total foil composition.

The aluminum alloy foil contemplated by the invention can be fabricated by any of the sequences currently employed in the art. For instance, an ingot can be hot and continuously rolled to form a sheet which is then cold rolled to a capacitor foil gauge, generally around 0.001 to 0.006 inch in thickness. If desired, known annealing and partial annealing treatments may be performed on the foil. Briefly, these treatments generally entail heating the foil to a temperature of about 300° to 1200° F.

As has been the practice in the art for some time, the specific capacitance of aluminum capacitor foil is increased by chemical or electrochemical etching treatments which serve to roughen the surface texture of the foil. The attendant increase in actual surface area results in an increase in specific capacitance, that is, the capacitance level associated with a given amount of foil. The etching techniques employed are known in the art and need not be described here. After etching, the foil, if intended to serve as the anode, is provided with a dielectric film, most often by anodic oxidation of the foil. This anodic oxidation is referred to as forming.

The following examples will illustrate the practice of the invention and the improvements achieved thereby.

EXAMPLE 1

Aluminum foil .003 inch in thickness composed of 99.99% minium purity aluminum and 0.007% cadmium together with incidental elements in amounts not exceeding those set forth hereinbefore, was cold rolled to final thickness and then annealed at 950° F. for 1 hour. The foil was then electrolytically etched in a solution of 200 grams per liter sodium chloride in water at 194° F. for one and a half minutes. The current density employed was 4.8 amps per square inch. After etching, a dielectric film was formed at a voltage of 30 volts. The capacitance of this aluminum foil was measured and compared to the capacitance of a foil standard, identical in every respect (composition, fabricating history, etc.) except for the addition of cadmium. The capacitance ratio was then determined to be 1.78. As is known, the capacitance ratio is a convenient means of comparison between a standard and a test specimen and is simply the ratio of the test specimen (containing cadmium) divided by the capacitance of the standard specimen (cadmium-free). A capacitance ratio of 1.78 then represents a 78% improvement over the standard.

EXAMPLE 2

Aluminum foil identical to that described in Example 1 was provided except that 0.006% indium was substituted for the cadmium. The foil was then etched and formed in the manner depicted in Example 1. Again, the capacitance of the foil was measured and compared to a standard as described in Example 1. The capacitance ratio here was found to be 1.10. An improvement of this order, ten percent, is considered highly significant in the capacitor industry.

EXAMPLE 3

Aluminum foil identical to that described in Example 1 was provided except that the foil contanied 0.0005% cadmium and was annealed at a temperature of 1030° F. for one hour. The foil was electrolytically etched in a solution of 80 grams per liter sodium chloride in water at 194° F. The current density was 0.8 amp per square inch. After etching, a dielectric film was formed at a voltage of 540 volts. The capacitance of this foil was measured and compared to a standard as described in Example 1. The capacitance ratio was 1.15, a 15% improvement.

It becomes apparent from the foregoing description that the improved foil is characterized by increased response to etching treatments such that the improved foil exhibits substantially improved capacitance over like foil devoid of the indium or cadmium additions herein set forth.

The above description is presented in terms of particular and preferred embodiments. It is to be understood that the appended claims are intended to encompass the true scope and spirit and are not necessarily limited to these embodiments.

What is claimed is:
1. Aluminum alloy capacitor foil consisting essentially of aluminum and 0.0002 to 0.015% of a metal selected from the group consisting of indium and cadmium.
2. Aluminum alloy capacitor foil according to claim 1 wherein the cadmium or indium is present from 0.002 to 0.010% and the aluminum is of at least 99.45% purity.
3. Aluminum alloy capacitor foil according to claim 2 wherein the foil contains 0.002 to 0.010% cadmium.
4. Aluminum alloy capacitor foil according to claim 2 wherein the foil contains 0.002 to 0.010% indium.
5. Aluminum alloy capacitor foil consisting essentially of 0.0002 to 0.015% cadmium and aluminum of at least 99% purity.
6. The aluminum alloy capacitor foil according to claim 5 wherein the foil contains 0.002 to 0.010% cadmium.

7. The aluminum capacitor foil according to claim 5 wherein the foil is in the etched condition.

References Cited

UNITED STATES PATENTS

| | | |
|---|---|---|
| 2,885,286 | 5/1959 | Weber _____ 75—138 |
| 3,258,318 | 6/1966 | Gruhl. |
| 3,379,636 | 4/1968 | Reding. |

OTHER REFERENCES

Samuels, L. E.: The Solid Solubilities of Tin, Indium, and Cadmium in Aluminum, in Journal of the Institute of Metals, vol. 84, 1955–56, pp. 333–336.

Hardy, H. K.: The Solid Solubilities of Cadmium, Indium, and Tin in Aluminum, in Journal of the Institute of Metals, vol. 80, 1951–1952, pp. 431–434.

HYLAND BIZOT, Primary Examiner

J. E. LEGRU, Assistant Examiner

U.S. Cl. X.R.

75—138; 317—230